United States Patent [19]

Springman

[11] Patent Number: 4,927,002

[45] Date of Patent: May 22, 1990

[54] CONVEYOR CHAIN HAVING DETACHABLE MEMBER FOR CARRYING ARTICLES

[75] Inventor: Charles G. Springman, Beech Grove, Ind.

[73] Assignee: AMSTED Industries Incorporated, Chicago, Ill.

[21] Appl. No.: 349,815

[22] Filed: May 10, 1989

[51] Int. Cl.$^5$ .............................................. B65G 17/12
[52] U.S. Cl. ................... 198/487.1; 198/719; 198/803.12; 198/731
[58] Field of Search ................ 198/719, 803.1, 803.12, 198/487.1, 733, 731

[56] References Cited

U.S. PATENT DOCUMENTS

| 1,707,088 | 3/1929 | Lynch | 198/803.12 |
| 2,338,032 | 12/1943 | Friden | 198/803.12 |
| 3,344,904 | 10/1967 | Kocian et al. | 198/803.12 |
| 3,365,158 | 1/1968 | Dowling | 198/803.12 X |
| 4,129,206 | 12/1978 | Talbott | 198/803.12 X |
| 4,388,990 | 6/1983 | Michalik | 198/803.1 |
| 4,501,351 | 2/1985 | Tracy | 198/803.1 |

FOREIGN PATENT DOCUMENTS

| 2234115 | 1/1974 | Fed. Rep. of Germany | 198/803.12 |
| 0149910 | 11/1981 | Japan | 198/803.12 |
| 0595943 | 2/1978 | Switzerland | 198/803.12 |

Primary Examiner—Robert J. Spar
Assistant Examiner—D. Glenn Dayoan
Attorney, Agent, or Firm—Charles E. Bouton; Edward J. Brosius

[57] ABSTRACT

A chain link conveyor having carrying members which comprise a shaft with a socket that is press fitted to a conveyor link pin and a supplemental link plate that is press fitted to the shaft and an adjacent paired link pin which supplemental link plate is held spaced from the conveyor pin link plate interconnecting the paired link pins.

16 Claims, 1 Drawing Sheet

CONVEYOR CHAIN HAVING DETACHABLE MEMBER FOR CARRYING ARTICLES

This invention relates to an improved article carrying member detachably secured to a conveyor chain and more particularly relates to a construction of such carrying member alone and in combination with a conveyor chain enabling breakaway of a carrying member without damage to the chain.

BACKGROUND OF THE INVENTION

Conveyor chains with one or more article carrying members are well known in the prior art. For examples: U.S. Pat. No. 1,707,088 to Lynch shows solid cylindrical rods extending to one side of successive roller chain links with each rod having a reduced shank in the form of a pintle that acts as a link pin in the chain; U.S. Pat. No. 4,501,351 to Tracy shows similar rods extending to one side of occasional special roller chain links wherein each rod pintle is plugged into a hollow link pin and the rod is coupled to an adjacent extended regular link pin by a supplemental link plate that is fastened substantially flush against an interconnected regular outer pin link plate by a cotter pin through the regular link pin; and U.S. Pat. No. 4,388,990 to Michalik shows a modified roller chain wherein each link pin extends uniformly beyond the outer pin link plate to one side of the chain and solid cylindrical rods are connected to and aligned with occasional pins by means of split sleeves or bushings which will open to release the rods should an obstruction occur in the conveyor path. There is also a known commercially available variation of the Tracy patent structure (produced by a division of the patent assignee, Incom International Inc.) wherein the pintle is eliminated and a hollow rod is press fitted to the end of one extended regular link pin and coupled to an adjacent extended link pin by a cotter pin and a supplemental link plate that is mounted flush with the rod end.

A disadvantage of the aforedescribed prior art, with the exception of the Michalik patent, is that the rods, which are spaced in accordance with the particular conveyor installation to carry items suspended to one side of a single chain conveyor, are made essentially integral with the chain and risk damage to the chain, such as a chain break or detachment from the chain drive, should something obstruct movement of the rods or articles carried thereby. Since these chains are usually utilized to transport articles between and through processing stations, such obstructions do occur; and additionally significant routine forces are imparted to the rods at the processing stations. While the structure of the Michalik patent overcomes, to a degree, the risk of chain damage, it involves a significant risk that the split sleeve will open to release the carrying rod when subjected to routine processing forces or that it will gradually allow the rod to slip away during repeated cycles through processing operations.

SUMMARY OF THE INVENTION

Accordingly it is a principle object of the present invention to provide an improved article carrying member for a conveyor chain that will readily detach without damage to the chain if subjected to unusual forces yet will not detach due to repeated routine forces.

Another object of the present invention is to provide an article carrying member that may be detachably mounted at any location on conveyor chain of uniform construction.

A further object of the present invention is to provide conveyor chain with spaced article carrying members which members may be readily replaced if detached from the chain.

Briefly stated the invention comprises a carrying member for a roller chain with at least pairs of link pins that uniformly extend a short distance beyond the outer pin link plates to one side of the chain, wherein the carrying member has a socket shaft shaped to receive a link pin end and a supplemental link plate that is held spaced and parallel outwardly of a chain outer link plate, which supplemental link plate is press fitted to both the shaft and an adjacent chain link pin.

BRIEF DESCRIPTION OF THE DRAWINGS

Further objects and advantages will become apparent upon reading the following detailed description of the present invention in conjunction with the accompanying drawings wherein.

DETAILED DESCRIPTION OF THE INVENTION

Figure 1:
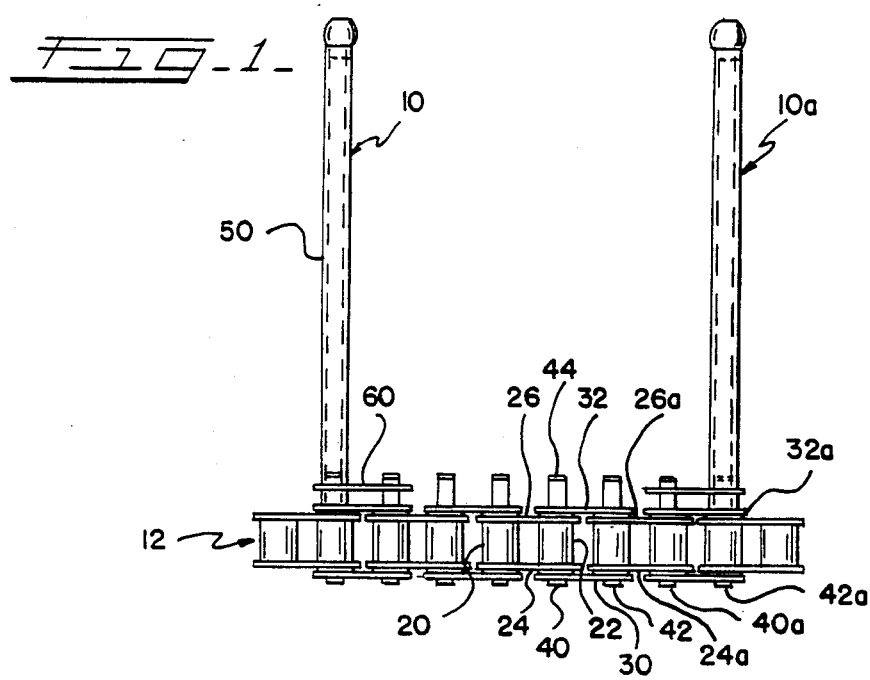
FIG. 1 is a plan view of a preferred embodiment of the invention with two article carrying members shown mounted from spaced links of a roller chain.
Figure 2:
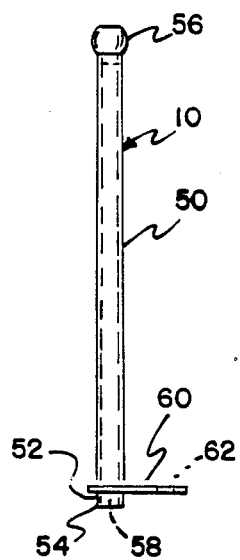
FIG. 2 is a plan view of a carrying member apart from a conveyor chain.

In FIG. 1 it will be seen that article carrying members generally 10 and 10a extend to one side of an essentially standard form of conveyor chain generally 12. The conveyor chain 12 comprises a plurality of sets of paired rollers 20, 22 rotatably supported on bushings or the like (not shown) between roller link plates 24, 26 with successive adjacent roller sets interconnected by outer pin link plates 30, 32 and link pins 40, 42. As is well understood, the link pins 40, 42 extend coaxially with rollers and holes (not shown) in successive pairs of roller link plates 24, 26 and 24a 26a and through holes (not shown) in the outer pin link plates 30, 32. In the preferred conveyor configuration each link pin has an extended end 44 that projects a short distance beyond the respective pin link plate 32, which distance is sufficient to receive the carrying member 10 as hereafter described. The projection distance will, of course, vary with the size of the chain, but a distance of about one half (0.5) inch is usually adequate for chain sized to have a pitch of about three quarters (0.75) of an inch.

The preferred carrying member 10 comprises an extension rod 50 having a hollow shaft 52 at one end 54 and a cap or knob 56 at the opposite end. The internal diameter of shaft 52 is sized to be slightly less than the outer diameter of a link pin end 44 so as to form a socket 58 that may be press fitted onto a first one of the paired link pins 40a, 42a; and the socket 58 is of a depth sufficient to receive the length of the extended end 44 projecting beyond a pin link plate 32a so that end 54 will abut the link plate 32a. A supplemental link plate 60 is fastened to the exterior of shaft 52 a short distance from end 54 which distance is slightly less than the length of link pin end 44 projecting beyond the link plate 32a. The supplemental link plate 60 corresponds generally to the link plate 32 and has a hole 62 spaced from the shaft 52 so as to receive the extended end of the second of the paired link pins 40a or 42a. The diameter of hole 62 is preferably of a size slightly less than the diameter of link pin end 44 so as to be secured thereto by a press fit.

Figure 3:
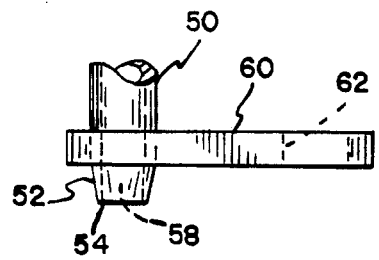
FIG. 3 is a detail view of a part of the carrying member shown in FIG. 2.

As shown in FIG. 3, the outer surface of shaft 52 extension rod 50 at end 54 is preferably slightly tapered so as to establish the space between supplemental link plate 60 and end 54. It is essential to the present invention that the supplemental link plate 60 be maintained at a distance outward from the outer pin link plate 32a when the carrying member is assembled onto the chain generally 12. This construction better distributes any load or force on extension rod 50 between a pair of link pins 40a and 42a and places the support closer to an applied load in contrast to being mounted flush with pin link plate 32a. Additionally it is essential that the shaft 52 and supplemental link plate 60 not be permanently locked onto the projecting ends of link pins 40a, 42a by welding or by fasteners such as cotter pins, or the like, as it is intended that the entire carrying member generally 10 be cleanly and readily detachable from the conveyor chain generally 12 so as to prevent damage to the latter and/or so as to facilitate low cost replacement of any carrying member 10 that is lost or broken.

That is to say, by assembling the extension rod 50 to supplemental link plate 60 with a press fit and similarly press fitting the socket 58 and hole 62 on adjacent link pins 40a, 42a, a minimum assembly cost is involved and the aforementioned parts will separate under excessive load or impact without significant risk of damage to the conveyor chain 12. Moreover, should the carrying member 10 be misshapen or partly disconnected but not completely broken away from the conveyor chain 12, it is readily detachable from the conveyor with a simple hand tool.

It is to be noted that in the preferred illustrated embodiment the carrying member generally 10 includes a hollow rod 50. While such a part is relatively light weight and economically fabricated, it is to be understood that the carrying member 10 may be modified without departing from the present invention. For instance the carrying member 10 may take a number of other convenient forms such as a hook, a mandrel, a tray or pan substituted for the rod 50; and the rod, or other form, may be solid instead of hollow outward of the socket 58 in shaft 52. Moreover, the carrying member generally 10 may be made from a wide variety of materials selected primarily to withstand the processing undertaken in a given application; and it may intentionally be made brittle and fracturable as by using carburized steel or a ceramic material so as to be breakable should blockage or unusually large forces occur.

Still further alterations and modifications may be made without departing from the spirit and scope of the present invention which is defined in the following claims.

What is claimed is:

1. An improved article carrying member for detachable mounting to link pin ends protruding from a roller type chain conveyor, said member comprising:
    a shaft with a socket at one end adapted to be press fitted onto a first link pin; and
    a supplemental link plate secured to said shaft spaced from said one end, said supplemental link plate having an opening, said opening being of a size and spaced from said shaft sufficient to be press fitted to a second link pin adjacent to said first link pin, whereby both said socket and said supplemental link plate will be readily separable from said first and second link pins upon excessive load or impact on said shaft.

2. The article carrying member of claim 1 wherein said socket is of a depth sufficient to fully receive the protruding end of said first link pin to enable said one end of said shaft to abut against a pin link plate of the conveyor, and said supplemental link plate is secured to said shaft a distance from said end less than said protruding link pin end.

3. The article carrying member of claim 1, including a rod extending from said shaft opposite said one end.

4. The article carrying member of claim 3 wherein said rod is hollow.

5. The article carrying member of claim 4 wherein said rod and said shaft are coextensive.

6. The article carrying member of claim 1 wherein said supplemental link plate is secured to said shaft by being press fitted thereon.

7. The article carrying member of claim 1 wherein said shaft is tapered.

8. The article carrying member of claim 6 wherein said shaft is tapered so as to guide said supplemental link to a press fit thereon spaced from said one end.

9. An improved chain conveyor with an article carrying member wherein the chain conveyor includes rollers on link pins wherein pairs of adjacent pins are interconnected by pin link plates outward of said rollers and an article carrying member extends outwardly of a pin link plate, said improvement comprising:
    at least first and second interconnected link pins having ends protruding beyond a pin link plate;
    a shaft with a hollow socket at one end said socket being press fitted on the protruding end of said first pin; and
    a supplemental link plate secured to said shaft spaced from said pin link plate, said supplemental link plate having an opening that is press fitted onto the protruding end of said second interconnected link pin so as to be held parallel to and spaced from said pin link plate, whereby both said socket and said supplemental link plate will readily separate from said first and second link pins upon excessive load or impact on said shaft.

10. The chain conveyor of claim 9 wherein said socket is of a depth sufficient to fully receive the protruding end of said first link pin to enable said one end of said shaft to press against a pin link plate of the conveyor, and said supplemental link plate is secured to said shaft a distance from said end less than said protruding end of a link pin.

11. The chain conveyor of claim 9 including a rod extending from said shaft opposite said one end.

12. The chain conveyor of claim 11 wherein said rod is hollow.

13. The chain conveyor of claim 11 wherein said rod and said shaft are coextensive.

14. The chain conveyor of claim 9 wherein said supplemental link plate is secured to said shaft by being press fitted thereon.

15. The chain conveyor of claim 9 wherein said shaft is tapered.

16. The chain conveyor of claim 14 wherein said shaft is tapered so as to guide said supplemental link to a press fit thereon spaced from said one end.

* * * * *